United States Patent [19]

Coley et al.

[11] Patent Number: 5,524,273
[45] Date of Patent: Jun. 4, 1996

[54] OVERLAPPING NON-INTERACTIVE RADIO PATCH METHOD

[75] Inventors: Casey S. A. Coley, Bowmanville; Paul J. Halinaty, Whitby, both of Canada

[73] Assignee: Motorola, Inc., Schaumburg, Ill.

[21] Appl. No.: 301,092

[22] Filed: Sep. 6, 1994

[51] Int. Cl.⁶ ........................................ H04B 7/14
[52] U.S. Cl. ............................. 455/17; 455/34.1
[58] Field of Search ...................... 455/74, 15, 16, 455/17, 34.1, 33.1, 33.2, 56.1, 53.1, 54.1, 54.2, 51.1, 38.1, 51.2; 370/60, 95.1, 94.1, 75, 97; 379/63, 58, 59

[56] References Cited

U.S. PATENT DOCUMENTS

| | | | |
|---|---|---|---|
| 4,644,345 | 2/1987 | Zdunek et al. | 455/34.1 |
| 5,020,132 | 5/1991 | Nazarenk et al. | 455/56.1 |
| 5,117,501 | 5/1992 | Childress et al. | 455/17 |

*Primary Examiner*—Andrew Faile
*Attorney, Agent, or Firm*—Frank M. Scutch, III

[57] ABSTRACT

A method of managing (150) an overlapping radio patch which allows a audio channel to be involved in multiple patches which are established at different dispatch positions. The method prevents interaction between channels that are not part of the same radio patch by maintaining dynamic profiles of channel assignments (153) and channel patches (155). Channel activity is tracked (157) and a connection instance count (CIC) is determined using the assignment and patch profiles as well as the channel activity. Audio connections are then managed (161) using the corresponding CIC's to dynamically switch connections. This ensures the connections are in place only when needed thereby avoiding any latent connections which would contend for network resources. The invention allows for the implementation of a composite channel concept which improves the overall capability of radio dispatch services in a multi-channel, multi-dispatcher environment.

14 Claims, 3 Drawing Sheets

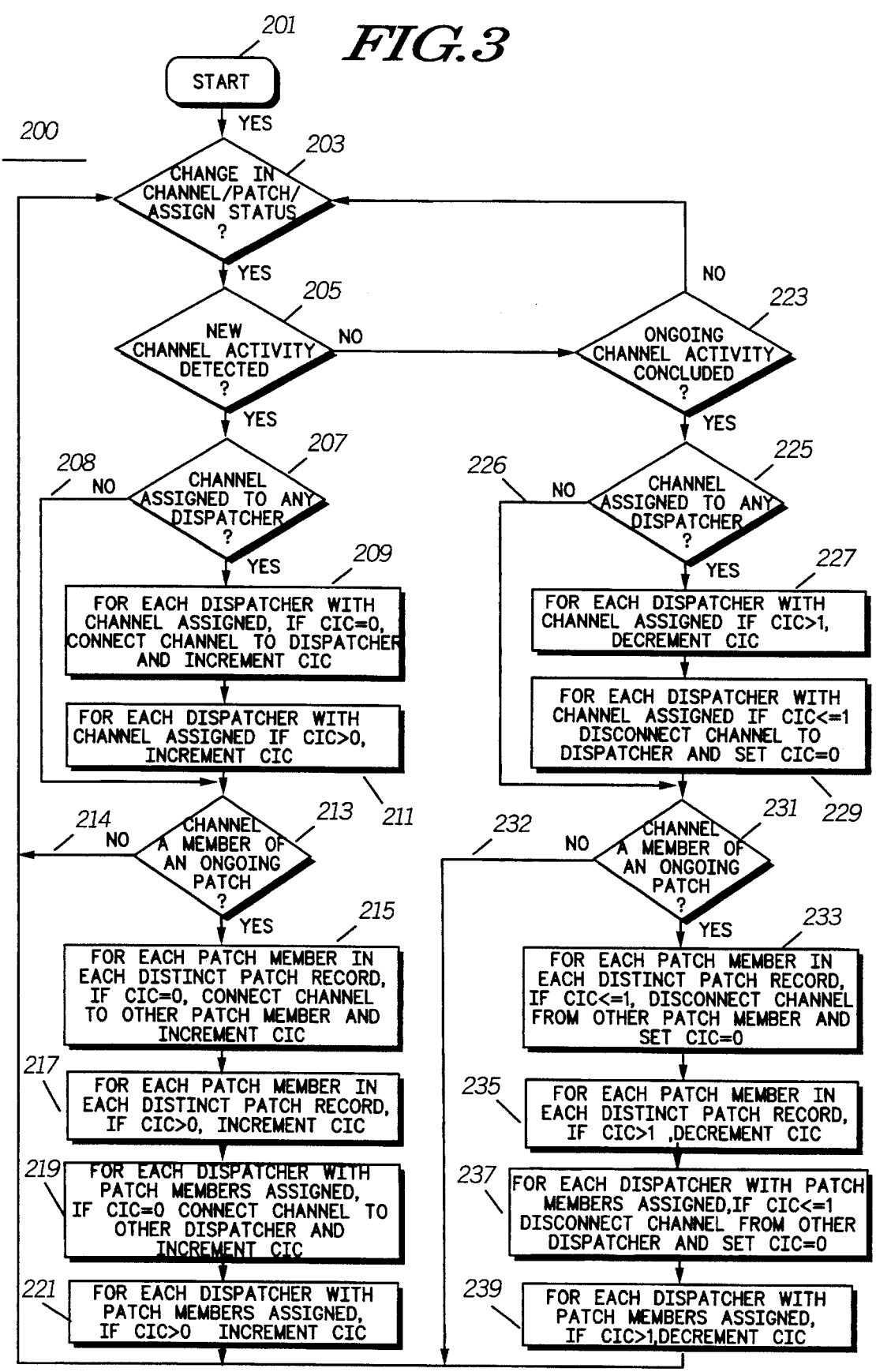

OVERLAPPING NON-INTERACTIVE RADIO PATCH METHOD

TECHNICAL FIELD

This invention relates in general to a method of communication system channel management, or more particularly to overlapping radio patch operation.

BACKGROUND

In today's public safety environment, various municipalities and public agencies are searching for new ways to consolidate their operations and improve efficiency. These improvements must be accomplished without compromising the quality of service provided to the public. Therefore, the communications systems which are utilized by these entities must be very flexible, even when numerous users are contending for resources within the system.

During busy periods, it often becomes difficult for a dispatch console operator to quickly and efficiently manage activity on numerous pre-designated communications channels. Moreover, several dispatch consoles currently support a "channel assignment" concept requiring a distinct representation (i.e. radio panel, channel control module, etc.) for each individual channel. Dispatchers that are required to manage activity on more than one channel must assign the necessary channels, each with their own distinct representation.

With a multitude of individual channel representations, confusion may subsequently arise as to the source of call activity. This is especially true if the dispatcher is not watching the call indicators at all times; which often tends to be the case since many dispatchers focus their attention on computer based dispatching aids.

One way to address this problem is to allow the dispatcher to consolidate their assigned channels by collapsing several distinct channels into a single operational entity. A single entity representing multiple channel resources is referred to as a Composite Channel. All members of a composite channel are managed from a single channel representation and all are patched together. The composite channel enables the operator to focus their attention on a single operational entity; hence, the risk of confusion is reduced and efficiency is improved.

In a multi-operator dispatch environment, with Composite Channel and traditional Patch capabilities, it is reasonable to expect that individual channels will need to be placed into more than one patch group to satisfy the needs of all operators. For example, individual operators may wish to create composite channels that have one or more channels in common. Another example would be the establishment of a patch that involves one or more composite channels. Scenarios such as these lead to contention among operators for individual channel resources.

Existing dispatch systems provide limited patch capabilities to ensure that channel resource contention does not adversely affect system operation. For example, a dispatcher or operator is typically not permitted to place a communications channel into a patch if it is already involved in another patch. Were this to be allowed, such an "overlap" condition between the respective patches would result in one large patch consisting of all channels involved in each of the overlapping patches. This condition would bring many operational difficulties to both the communications system and the dispatcher. When each distinct patch is established, it is neither the desire nor the intent of the dispatcher to create a patch involving channels other than those that have been explicitly designated.

The benefits of consolidation previously described cannot be realized if individual channels can be involved in only one patch at a time. Therefore, the need exists for a method which can manage system audio connections by allowing a channel to be involved in multiple patches, established at different dispatch positions, while preventing interaction between channels which are not part of the same radio patch. Thus, a method is needed to manage dispatcher/radio channel interactions in such a way that the need to restrict access to radio patch capabilities is eliminated. Eliminating these restrictions while maintaining an orderly dispatch environment will improve the overall flexibility of the dispatch system. Additionally, a composite channel assignment method is needed which is an extension of the traditional channel assignment concept and can address the above requirements allowing a single point of control.

BRIEF DESCRIPTION OF THE DRAWINGS

FIG. 3 is a flow chart showing the operation of the method of the present invention.

DETAILED DESCRIPTION OF THE PREFERRED EMBODIMENT

Figure 1:
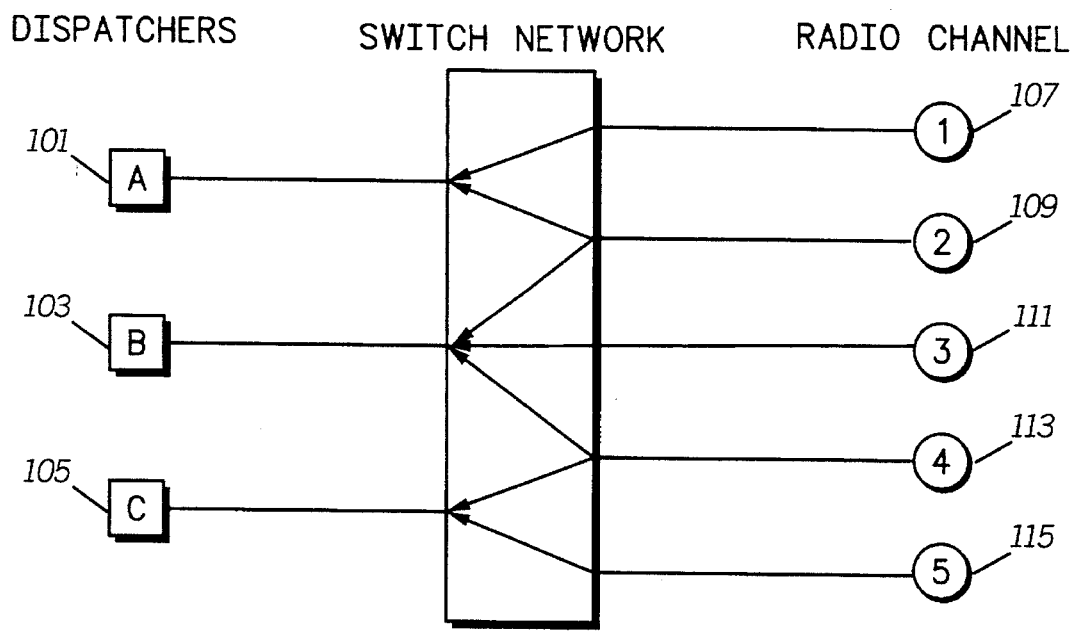
FIG. 1 is a block diagram showing the configuration of a communications system utilizing the method of the present invention.

Referring now to FIG. 1, a typical dispatch system 100 includes dispatch positions 101, 103 and 105 which are used with channels 107, 109, 111, 113, and 115. The directional arrows indicate the assignment of channels 107–115 through switching network 117 with dispatch positions 101, 103 and 105. In this configuration, two overlap conditions exist on channels 109 and 113 with dispatch positions 101 and 105 respectively. This configuration is by way of example only, and it will be evident to those skilled in the art that any type of configuration, channel assignment or overlap condition is possible.

The platform to which the method of the invention is applied consists of a multitude of radio channel resources and dispatch console positions as shown in FIG. 1. Dispatchers 101, 103, 105 control channel assignment. Channel assignment is the means by which dispatchers establish operations on designated channels 107–115. This is in contrast to channel patching where dispatchers combine operations of designated channels.

In order to facilitate non-interactive overlapping patches, the method of the invention is based on the following general precepts:

A Dispatcher receives all transmissions that "involve" their assigned channels. The term involve includes inbound traffic from subscribers on the channel, outbound traffic from subscribers on channels that are explicitly patched to the channel (at any dispatch position) and outbound traffic from other dispatchers who have the same channel assigned at their positions. A Dispatcher transmits only on those channels that are assigned at their position, regardless of any patch conditions.

A Subscriber receives all transmissions that "involve" their assigned channel. The term involve includes outbound traffic from dispatchers with the subscriber channel assigned at their position and outbound traffic from subscribers on other channels that are explicitly patched to the channel (at any dispatch position).

Figure 2:
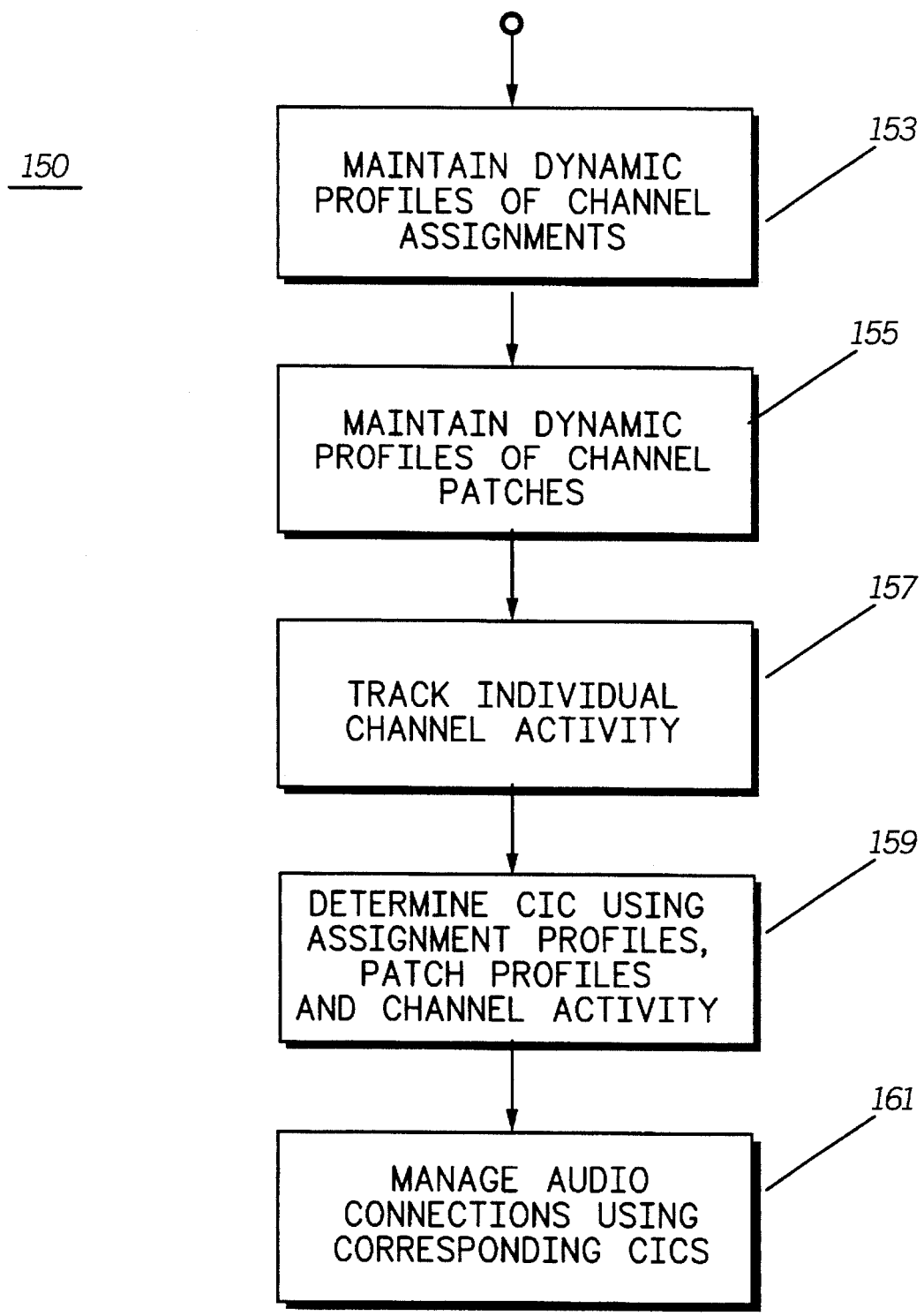
FIG. 2 is a flow chart showing a general overview of the method of the present invention.

A flow chart showing the general operation of the method of the present invention is shown in FIG. 2. The method 150 requires that all individual dispatcher channel assignments be profiled and maintained 153, for example an Assignment Table. This table is organized in such a way that all dispatchers, that have a particular channel assigned, may be directly associated with activity on the channel. The contents of the assignment table are dynamic and are changed to reflect either the deletion of existing assignments or the creation of new assignments at any dispatch position in the system. The method uses this table to determine which dispatch positions are affected by a change in the state of a communication channel.

Further, the method also requires that all individual patches be profiled and maintained 155, for example in a Patch Table. This table is organized in such a way that each patch, its originating dispatcher and its constituent member channels are distinctly defined and maintained for the duration of the patch. The contents of the patch table are dynamic and are changed to reflect the deletion of existing patches or the creation of new patches at any dispatch position in the system. The method uses this table to determine which channel resources are affected by a change in the state of a particular channel. Further, the method also requires that all channel activity be detected and tracked 157. By its very nature, channel activity is dynamic and it is therefore tracked in real-time.

Finally, the method requires that a Connection Instance Count (CIC) be maintained for every individual audio connection in the system 159. This element is essential since multiple instances of a particular audio connection can be established by different aspects of system operation. For example, two instances of a connection will be established between a dispatcher and an assigned channel that is patched to another assigned channel and is receiving a signal. One instance of the connection will be due to the channel assignment since the dispatcher must receive all inbound activity on an assigned channel. The other connection instance will be due to the channel patch since the dispatcher must receive all patch related outbound activity that is destined for an assigned channel. Should the patch condition be cleared while the channel is active, the connection must be maintained because the assignment related connection instance remains. Hence, a particular connection is established only when the associated CIC is incremented from zero to one and the connection is removed only when the associated CIC is decremented from one to zero 161. Subsequent creation of new instances or deletion of existing instances are reflected as increments to the CIC or decrements to the CIC respectively.

One scenario that will arise repeatedly when using this method involves the connection of multiple audio sources to a single audio destination. This will occur, for example, when an individual channel is involved in two or more patches, and there is activity on other member channels of each of the patches. In this case, audio from the patches will be destined for the common channel and will be mixed on that channel.

FIG. 3 shows a flow chart diagram describing the method 200 of audio connection management which supports an overlapping radio patch operation. A communications system initiates the method 201 which designates a "change" in the system audio configuration (i.e. channel assignment, channel patch and/or channel activity). It is important to note that the method utilizes a dynamic connection scheme which establishes individual connections only when they are needed to carry traffic. Hence, upon any change to the system audio configuration, the potential need for new connections is analyzed and the status of existing connections is reviewed.

If there is a change in activity, assignment or patch status 203 the method looks to determine the nature of the change. The occurrence of new activity 205 will take the following forms:

(1) Receive activity is detected on the channel;
(2) The channel is involved in a new assignment at any dispatch position in the system; or
(3) The channel is involved in a new patch created at any dispatch position in the system.

The conclusion of ongoing activity 223 will take the following forms:

(1) There is no longer any receive activity on the channel;
(2) The channel is reassigned at any dispatch position in the system; or
(3) A patch involving the channel is cleared at any dispatch position in the system.

When new channel activity is detected 205, the method first determines the need for channel-to-dispatcher connections on the basis of explicit channel assignments 207. If the new activity is a result of new channel activity or a new channel assignment, the appropriate channel-to-dispatcher CIC(s) will be incremented. If the CIC is incremented from zero to one 209, the audio connection is established; otherwise 211, the method recognizes that the necessary connection is already in place and continues without further action. This portion of the method ensures that dispatchers receive all inbound activity on their assigned channels. It is also possible that the channel is not explicitly assigned to a dispatcher in which case this portion of the method is bypassed 208.

The method then determines the need for channel-to-channel connections on the basis of established patches 213. If new activity is a result of new channel activity or a new patch involving the channel, the appropriate channel-to-channel CIC(s) will be incremented. If the CIC is incremented from zero to one 215, the audio connection is established; otherwise 217, the method recognizes that the necessary connection is already in place and continues without further action. This portion of the method ensures that activity on a channel is routed to all other channels to which it is patched.

Finally, as a result of new channel activity or a new patch involving the channel, the appropriate channel-to-dispatcher CIC(s) will be incremented. If the CIC is incremented from zero to one 219, the audio connection is established; otherwise 221, the method recognizes that the necessary connection is already in place and continues without further action. This portion of the method ensures that outbound activity, on a channel resulting from a patch, is received by all dispatchers that have the channel assigned. It is also possible that the channel is not involved in any patches in which case this portion of the method is bypassed 214.

When ongoing channel activity has concluded 223, the method first determines the need to remove channel-to-dispatcher connections on the basis of explicit channel assignments 225. If the conclusion is a result of the cessation of channel activity or a channel deassignment, the appropriate channel-to-dispatcher CIC(s) will be decremented. If the CIC is decremented from one to zero 229, the audio connection is removed; otherwise 227, the method recognizes the ongoing need for the connection and continues without further action. It is also possible that the channel is not explicitly assigned to a dispatcher in which case this portion of the method is bypassed 226.

The method then determines the need to remove channel-to-channel connections on the basis of established patches 231. If the conclusion is a result of the cessation of channel activity or removal of a patch involving the channel, the appropriate channel-to-channel CIC(s) will be decremented. If the CIC is decremented from one to zero 233, the audio connection is removed; otherwise 235, the method recognizes the ongoing need for the connection and continues without further action.

Finally, as a result of the cessation of channel activity or removal of a patch involving the channel, the appropriate channel-to-dispatcher CIC(s) will be decremented. If the CIC is decremented from one to zero 237, the audio connection is removed; otherwise 239, the method recognizes the ongoing need for the connection and continues without further action. It is also possible that the channel is not involved in any patches in which case this portion of the method is bypassed 232.

In summary, the method of the present invention allows the communications system, having a plurality of channels, to support overlapping patches in such a way that there is no interaction between channels not explicitly patched. This occurs even though the channels may be involved in patch groups that contain common channels. The instant method does this by tracking each distinct channel assignment, tracing each radio patch and tracking the activity on each channel. Dynamic switching is then performed on the basis of each of these parameters. In tracking each channel during each instance of each connection the system ensures that connections are in place only when needed so latent connections do not result in unnecessary resource contention. When contention for an audio destination arises, the instant method will mix the audio signals from the various stations or sources. This however, will not preclude the system operation from giving preference to on audio source over others on the basis of a predetermined priority scheme or on a first-come-first-served basis.

There are many benefits arising from the use of the present method. These include allowing a multi-channel communications system to give better performance by allowing a channel to be involved in more than one patch. The ability to introduce a workable composite channel scheme. The creation of composite channels without regard for pre-existing patch activity within a system. The ability to freely patch composite channels without regard for preexisting patch activity within the system. The ability to patch or connect patches, i.e. establish a patch between existing patches, without regard for pre-existing patch activity within the system.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. In a radio communications system that includes a plurality of communication units, a method of providing a patch arrangement among a plurality of communication resources used to facilitate communication among the communication units, the method comprising the steps of:

dynamically maintaining a plurality of assignment profiles, each of which define a distinct association between an individual communication resource and an individual communication unit;

dynamically maintaining a plurality of patch profiles, each of which define a distinct association between a plurality of communication resources;

tracking activity on each of said plurality of communication resources; and dynamically maintaining a plurality of counters, each of said counters maintaining a running total of an associated instance count, where a first portion of said counters are associated with one of each possible connection that may exist between said plurality of communication resources and said plurality of communication units, a second portion of said counters are associated with one of each possible connection that may exist between said plurality of communication resources and a third portion of said counters are associated with one of each possible connection that may exist between said plurality of communication units, and further wherein each of said steps of dynamically maintaining is performed on the basis of said plurality of assignment profiles, said plurality of patch profiles and said communication resource activity.

2. The method according to claim 1 wherein connection instances are established only between those communication resources and communication units that are explicit members of a distinct assignment profile or a distinct patch profile, and further including the steps of:

dynamically establishing or removing any of said possible connections between communication resources and communication units on the basis of said running total of instance count such that said connections are established only when needed thus preventing interaction between communication resources and communication units that is not explicitly defined in said plurality of assignment profiles or said plurality of patch profiles; and dynamically establishing or removing any of said possible connections between communication resources on the basis of said running total of instance count such that said connections are established only when needed thus preventing interaction between communication resources that is not explicitly defined in said plurality of patch profiles.

3. The method according to claim 1 wherein connections between communication resources and between communication resources and communication units are established only when required for preventing interaction between communication resources and between communication resources and communication units which are not explicitly defined in said plurality of assignment profiles or said plurality of patch profiles, preventing said interaction by eliminating latent connections and unnecessary resource contention, comprising the steps of:

detecting and tracking new activity on each of said plurality of communication resources;

establishing connections between newly active communication resources and communication units on the basis of said assignment profiles;

establishing connections between newly active communication resources and other communication resources on the basis of said patch profiles;

establishing connections between newly active communication resources and communication units assigned to patched communication resources on the basis of said patch profiles and said assignment profiles;

detecting and tracking conclusion of activity on each of said plurality of communication resources;

removing connections between newly inactive communication resources and communication units on the basis of said assignment profiles;

removing connections between newly inactive communication resources and other patched communication resources on the basis of said patch profiles;

removing connections between newly inactive communication resources and communication units assigned to patched communication resources on the basis of said patch profiles and said assignment profiles;

establishing or removing connections between already active communication resources and communication units assigned to patched communication resources on the basis of dynamic changes to said assignment profiles;

establishing or removing connections between already active communication resources and other patched communication resources assigned to patched communication resources on the basis of dynamic changes to said patch profiles; and establishing or removing connections between already active communication resources and communication units assigned to patched communication resources on the basis of dynamic changes to said patch profiles and/or dynamic changes to said assignment profiles.

4. The method according to claim 1 further including the step of: combining traffic originating simultaneously from multiple communication resources and communication units, said traffic destined for any one communication resource on the basis of at least one assignment profile or patch profile, said combining including mixing of audio signals corresponding to the traffic from the originating communication resources or communication units such that an aggregate of said traffic appears at the destination communication resource.

5. The method according to claim 1 wherein said communication units are dispatch consoles and subscribers.

6. The method according to claim 1 wherein connection instances are established only between those communication resources that are explicit members of a distinct patch profile.

7. The method according to claim 1 wherein connection instances are established only between those communication resources and communication units that are explicit members of a distinct assignment profile.

8. The method according to claim 1 wherein connection instances are established only between communication resources and communication units, said communication resources being members of any patch profile containing communication resources that are members of any assignment profile associated with said communication units.

9. The method according to claim 1 wherein said resources are radio channels comprised of conventional radio channels and talk groups.

10. The method according to claim 1 wherein said assignment profile includes at least one table to manage distinct channel assignments.

11. The method according to claim 1 wherein said patch profile includes at least one table to manage distinct radio patches.

12. The method according to claim 1 wherein said tracking activity includes utilizing at least one table to track channel activity.

13. The method according to claim 1 wherein said maintaining of connection instances includes at least one table to manage all possible Connection Instance Counters.

14. The method according to claim 1 wherein at least one of said plurality of communication resources are involved in more than one patch profile.

* * * * *